US010958728B1

(12) United States Patent
Baturin (10) Patent No.: US 10,958,728 B1
(45) Date of Patent: *Mar. 23, 2021

(54) MAIL SERVER MIGRATION WITH MESSAGE SYNCHRONIZATION

(71) Applicant: Plesk International GmbH, Schaffhausen (CH)

(72) Inventor: Alexey Baturin, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,997

(22) Filed: Jul. 11, 2019

Related U.S. Application Data (63) Continuation of application No. 15/267,354, filed on Sep. 16, 2016, now Pat. No. 10,356,171.

(51) Int. Cl.
*H04L 29/08* (2006.01)
*H04L 12/58* (2006.01)
*H04L 29/06* (2006.01)

(52) U.S. Cl.
CPC .......... *H04L 67/1095* (2013.01); *H04L 51/22* (2013.01); *H04L 67/14* (2013.01); *H04L 67/40* (2013.01)

(58) Field of Classification Search
CPC ..... H04L 67/1095; H04L 51/22; H04L 67/14; H04L 67/40
USPC ........................................................ 709/206
See application file for complete search history.

(56) References Cited

U.S. PATENT DOCUMENTS

| 8,713,098 B1* | 4/2014 | Adya .................... H04L 67/148 709/203 |
| 9,904,717 B2* | 2/2018 | Anglin .................... G06F 16/27 |
| 2003/0088633 A1* | 5/2003 | Chiu ........................ H04L 29/06 709/206 |
| 2004/0254976 A1* | 12/2004 | Malik .................... H04L 67/306 709/200 |
| 2005/0267938 A1* | 12/2005 | Czeczulin ............ G06Q 10/107 709/206 |
| 2007/0016613 A1* | 1/2007 | Foresti ................. G06Q 10/107 |
| 2009/0187632 A1* | 7/2009 | Alarid ..................... H04L 67/06 709/206 |

* cited by examiner

*Primary Examiner* — Umar Cheema
*Assistant Examiner* — John Fan
(74) *Attorney, Agent, or Firm* — Bardmesser Law Group (57) ABSTRACT

Mail server migration. For each mailbox, a migration utility is started on a target server to get a list of message IDs that have already been migrated. The command "listmessage-ids" is executed. The migration utility is started on the source server in a backup mode. The "backup" command is executed. Then, the migration utility is started on the target server in a restore mode. A "restore" command imports the messages. The migration utility on the source server provides mail messages to a standard output. The migration utility on the target server accepts mail messages on the standard input and restores them. RPC agent transfers data via TCP once it gets it from the migration utility on the source server. The migration module receives data from the RPC agent and puts data to the standard input of the migration utility on the target server as soon as it receives it.

7 Claims, 9 Drawing Sheets

MAIL SERVER MIGRATION WITH MESSAGE SYNCHRONIZATION

BACKGROUND OF THE INVENTION

Field of the Invention

The invention relates to a server migration, and, more particularly, to a method and system for mail server migration with message synchronization.

Description of the Related Art

Mail servers are commonly used by large and small enterprises. Migration of a mail server is often needed and can present a problem, especially, when a large number of mail boxes having thousands (or often hundreds of thousands) of messages need to be migrated. Conventionally, migration involves a complete dump of all mail boxes/messages on a source server in a form of ".zip" archive. Then, the ".zip" archive is loaded onto a target server where it is unpacked and messages are placed into corresponding mail boxes. This process is very slow because archiving and unpacking can take a long time (e.g., several days in the case of large mailboxes and multiple users).

Furthermore, the conventional mail server migration does not allow for mail synchronization between the source server and the target server, even though the user continues to receive mail during this time. This mail can be lost during migration. In order to recover this mail, a full dump and archiving is required, which, in turn, can cause some more mail messages losses. Building a ".zip" archive requires knowledge about the mail server: for each new mail server type a new way of archive creation and restoration should be developed. The archive can not be transferred between different server types as they could store mail messages in different formats.

Another conventional option is standard IMAP protocol which could be used to transfer and synchronize messages, but it works slowly because it is a text protocol and so it has communication overhead.

Accordingly, it is desired to have an efficient method for mail server migration without losing any mail messages during the migration, which could transfer messages between different mail server types, and does not require additional development time for each new mail server type.

SUMMARY OF THE INVENTION

The invention relates to server migration, and, more particularly, to a method and system for mail server migration with message synchronization that substantially overcomes one or more disadvantages of the related art.

According to an exemplary embodiment, for each mailbox, a MailMigrator is started on a target server to get a list of message IDs that have already been migrated. The command "list-message-ids" is executed. A MailMigrator is started on the source server in a backup mode. The "backup" command is executed. The MailMigrator is started on the target server in a restore mode. The "restore" command is executed. The MailMigrator on the source server provides mail messages to a standard output. The MailMigrator on the target server accepts mail messages on the standard input and restores them. The standard output of the MailMigrator on the source server is connected to the standard input of the MailMigrator on the target server with the help of an RPC (Remote Procedure Call) agent.

The RPC agent transfers data via TCP as soon as it gets it from the MailMigrator on the source server, the Migrator puts data to the standard input of the MailMigrator on the target server as soon as it receives it.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are used throughout the description.

MailMigrator (also referred to "migration utility")—an executable program module configured to perform the following operations: backup mail messages of specified mailbox, restore mail messages of a specified mailbox, list IDs of messages of specified mailbox.

Migrator (also referred to as "migration module")—an executable program module installed on a target server, which provides a user interface and controls a process (workflow) of mail migration: runs MailMigrator with necessary arguments in a required sequence, communicates with a remote server over a network, notifies a user once migration is finished, etc. Also, it is responsible for batch processing of multiple mail servers, mail domains and mailboxes.

RPC (remote procedure call) agent—an executable program module installed on the source server, which accepts commands from the network (TPC/IP), executes them on the source server and returns the results (output, exit code, files) over a network.

Message ID—a string that identifies one message from another. Different messages of a mailbox should have different message IDs, the same message on different servers should have the same message ID.

Message IDs file—a text file, which has message ID strings, delimited (for example) by a new line from each other.

Mail server API—an Application Programming Interface configured to be used with a mail server: list messages, read messages and different parts of messages, add new messages, etc. The API can be used to integrate the mail server with other software components.

Mail storage—a physical storage for storing mail boxes and mail messages. In most cases, messages are stored in files on disk, but other ways are possible. There could be different ways of storing messages—i.e., when each message is in a separate file, when several messages are stored in a single file. A format of storage can be different as well.

Mail message has several parts:
Headers: message headers, as per RFC822
Body: message text
Flags: IMAP flags, for example if the message was read by mailbox user, or it is new; whether it was answered, etc.—Folder: IMAP folder, for example "INBOX," "Sent," and so on. Folders could have hierarchy, for example, there could be "INBOX\Notifications."

Server-specific format reflects how a message with all its parts is stored on a specific mail server.

Server-independent format determines how a message with all of its parts is presented during a transfer. The MailMigrator converts messages stored in server-specific format to server-independent format during backup and vice-versa during restore. The format allows migration between different mail servers. The format is preferred to be binary, not a text (e.g., XML, JSON, YAML) for the best performance.

Data flow—a sequence of bytes, i.e., a sequence of messages in a server-independent format. The data flow is the output of MailMigrator in a backup mode, and an input of the MailMigrator in a restore mode. The data flow is transferred over a network through an RPC agent and a Migrator.

The present invention is directed to a method, system and computer product for a mail server migration. According to an exemplary embodiment, the key features of mail migration on are:

An ability to synchronize messages again once the migration is finished;
A small disk usage for temporary files. No message backup files are created—the data is streamed directly to the target server;
Adaptive speed of migration. The method automatically uses the best available way of transferring data depending on source and target mail server types and implementation of backup and restore in MailMigrator for these servers. The servers are divided by speed into two types: the first type stores each message in a file with unique ID, the second one stores messages in any other way.

An ability to perform transfer between practically any server type: when MailMigrator tool does not have optimized backup or restore implementation for specific mail server, it falls back to standard protocols like IMAP, POP3 and SMTP, that are slow, but are available on any mail server. The following recommendation could be used: if development efforts for implementation of optimized backup and restore are more than time of migration for all mail servers one needs to migrate over standard protocols, then it is more efficient to use the standard protocols.

An ability to perform transfer between different mail servers (i.e., for example, from SMARTERMAIL™ to MAILENABLE™). Moreover, it is possible to perform transfer between different platforms (for example, from WINDOWS™ to LINUX™).

According to the exemplary embodiment, a MailMigrator utility is uploaded to both source and target servers. For each mailbox, a MailMigrator is started on a target server to get a list of message IDs that have already been migrated. The command "listmessage-ids" is executed. A MailMigrator is started on the source server in a backup mode. The "backup" command is executed. The MailMigrator is started on the target server in a restore mode. The "restore" command is executed. The MailMigrator on the source server provides mail messages to a standard output. The MailMigrator on the target server accepts mail messages on the standard input and restores them. The standard output of the MailMigrator on the source server is connected to the standard input of the MailMigrator on the target server with the help of an RPC (Remote Procedure Call) agent.

The RPC agent transfers data via TCP as soon as it gets it from the MailMigrator on the source server, the migrator puts data to the standard input of the MailMigrator on the target server as soon as it receives it.

The data flow looks in the following way when transferring messages:

1. On the source server, MailMigrator, started in backup mode, puts data to standard output.
2. On the source server, data from standard output of MailMigrator is read by RPC agent.
3. On the source server, the RPC agent sends data via network (TCP/IP) to Migrator.
4. On the target server, Migrator receives data from network and puts it to standard input of MailMigrator started in restore mode.

Thus, data flow chain looks like this:

MailMigrator in backup mode—standard output—RPC agent—network (TCP/IP)—Migrator—standard input—MailMigrator in restore mode. MailMigrator in backup mode and RPC agent work on the source server. Migrator and MailMigrator in restore mode work on the target server.

Note that if a user needs to troubleshoot the mail migration process or to transfer mail messages without the Migrator or the RPC agent, the user can redirect an output of the "backup" command of the MailMigrator on the source server to a file, and transfer the file from the source server to the target server. Then, the user can start the "restore" command of the MailMigrator on the target server, providing the transferred file at standard input.

The following steps could be used to detect a failed component:

1. Run MailMigrator in backup mode on the source server for specific mailbox, redirect standard output to a file. Wait till it finishes work.

2. Check if there are any errors reported by MailMigrator. If there are any errors—continue investigation of "backup" mode of MailMigrator.

3. Inspect the file: it should be of a correct format, contain all messages from the mailbox on the source server except for those ones specified in the exclude list file. If the file is corrupted or some data is missing or incorrect—continue investigation of "backup" mode of MailMigrator.

4. Transfer the file on the target server with the network (TCP/IP). If there are any issues, for example TCP connection from the source to the target server fails, then continue investigation of the network issue.

5. Run MailMigrator in restore mode on the target server for specific mailbox, put file with messages to standard input of MailMigrator. Wait till it finishes.

6. Check if there are any errors reported by MailMigrator. If there are any errors—continue investigation of "restore" mode of MailMigrator.

7. Check mail messages restored on the target mail server. If some messages are missing or contain incorrect data, then continue investigation of "restore" command of MailMigrator. Also it could be an issue at the target mail server side.

8. If everything is migrated correctly after following these steps, it makes sense to troubleshoot Migrator and RPC agent components. To backup or restore messages, the MailMigrator should know type of mail server it works with. Detection of a mail server could be implemented as follows. When the MailMigrator is started on a source or a target server, it tries to detect which type of a mail server is installed there. For example, in case of a migration from a WINDOWS™ server with PLESK™ control panel installed, it could check a PLESK™ branch in WINDOWS™ registry to find the configured mail server. In other cases, it could try to detect an appropriate mail server by trying to load DLLs of that mail server, by checking registry keys specific to the mail server, checking file paths specific to the mail server, checking list of running processes etc. If no mail server was detected, the MailMigrator attempts to use IMAP to copy mail messages as the most universal way that works with practically any kind of mail server. Additionally, mail server type can be explicitly specified by a user using advanced configuration.

According to the exemplary embodiment, the messages are synchronized. A key requirement for the migration utility is an ability to synchronize messages once migration is finished. In order to synchronize the messages, the messages have to be identified for:

keeping them unique during multiple migrations; and
improving a speed of migration by not transferring messages that were already transferred.

For each type of mail server, MailMigrator should have a method for listing all message IDs that had been already transferred by previous migrations. This should be implemented by a "list-message-ids" command of MailMigrator. On the other side, the MailMigrator started in "backup" mode must be able to accept list of message identifiers that should not be backed up. This can be implemented by an "exclude-message-ids-file" option of the "backup" command.

Different mail servers have their own internal messages IDs, which makes identifying messages somewhat difficult. Generally, the internal message IDs cannot be used when:

migrating between different sorts of mail servers, they could have completely different internal ID (for example MAILENABLE™ to SMARTER-MAIL™);—syncing mail, in case when the internal message ID is just an incremented number: consider that after the migration the message ID was equal to 106, and after the migration both source and target servers received a new (different) message. So, there will be a message with different content but the same ID.

To solve the problem it is reasonable to use RFC "Message-ID" field, which exists practically for every message, and is quite unique. However, reading it requires reading of headers of the message, so it is bad from a performance point of view. When the field does not exist, it is reasonable to generate a hash (for example, MD5) of message content.

Another interesting case that could improve performance of mail messages sync is when a mail server stores messages in files—one file per message, and the files can have any names supported by the file system on the server. Thus, the file names can be used as message identifiers. Listing files on a file system is a very fast operation, which does not require reading and parsing each message. Examples of such servers are MAILENABLE™ and ICEWARP™. These servers will be referenced below as mail servers of type 1. All other servers will be referenced as mail servers of type 2.

So there are 3 kind of source of message identifier: filename, "Message-ID" header and hash of mail message body. When comparing message identifiers received from different sources, or when using message identifiers received from "Message-ID" header as file names, they should be normalized, to avoid issues with limitations on filename: it could have limited length, some characters could be prohibited. Also, when migrating from case-sensitive file system to case-insensitive file system, message identifiers should be converted to the same lower-case or upper-case form.

According to the exemplary embodiment, the solution used is the following:

When migrating from mail server of type 1 to another mail server of type 1, the fast file names are used as message IDs. So, synchronization works fast.

When migrating between mail servers of type 2, the slow "Message-ID" field of a message header are used, with fallback to hash of the entire message. Thus, the synchronization works slow, but the time is saved mostly because the messages that already exist are not transferred over a network. When migrating from a mail server of type 1 to a mail server of type 2, the following algorithm is used. When the MailMigrator backs up messages from a server of type 1, a list of "Message-ID" fields from a server of type 2 is provided. First, MailMigrator checks if the filename is equal to "Message ID", which is not true. Then headers of each message is read and the MailMigrator checks its "Message ID", so comparison is quite slow to decide if the message should be included it in the dump. Thus, synchronization works slow in this case, but the time is mostly saved because the messages that already exist are not transferred over network.

When migrating from a mail server of type 2 to a mail server of type 1: when the MailMigrator restores messages, old "Message-ID" becomes a file name. Listing of messages that have already been migrated is quite fast—it requires only a listing of directories on the file system. However, comparison when backing messages up is still quite slow: headers of each message should be read to make decision if it should be transferred or not.

According to the exemplary embodiment, all errors during backup and restore are reported to a standard error stream. For MailMigrator running on the source server standard error stream is taken by RPC agent and passed to Migrator via the network (TCP/IP). For MailMigrator running on the target server standard error stream is taken by Migrator directly. Once mail migration is finished, Migrator shows all errors collected from MailMigrator running on both servers in a single migration report. Migration report could be printed to console, shown in a graphical user interface of Migrator, or put to a file for further reference. The user should read the report, and based on kind of errors decide if the migration could be considered successful or not. If the migration is not considered successful, the report could be helpful for troubleshooting.

Also for better troubleshooting, MailMigrator could write all operations it performs to log files. This feature could be enabled or disabled by using special option of MailMigrator: in general it should be disabled to avoid overhead on log file write to get the best performance of migration. But in case of troubleshooting the user could enable that feature. The exemplary embodiment uses a binary format of a dump file to avoid possible performance issues with text formats (i.e., such as, for example XML, JSON or YAML).

The dump file consists of a sequence of messages. Each message includes the following sequence:
  32-bit integer: message id length;
  sequence of bytes: message id;
  32-bit integer: message folder length;
  sequence of bytes: message folder;
  32-bit integer (bitwise mask): message flags;
  32-bit integer: message contents length;
  sequence of bytes: message contents.

An example of configuration file for the Migrator is provided in appendix i.

Figure 1:
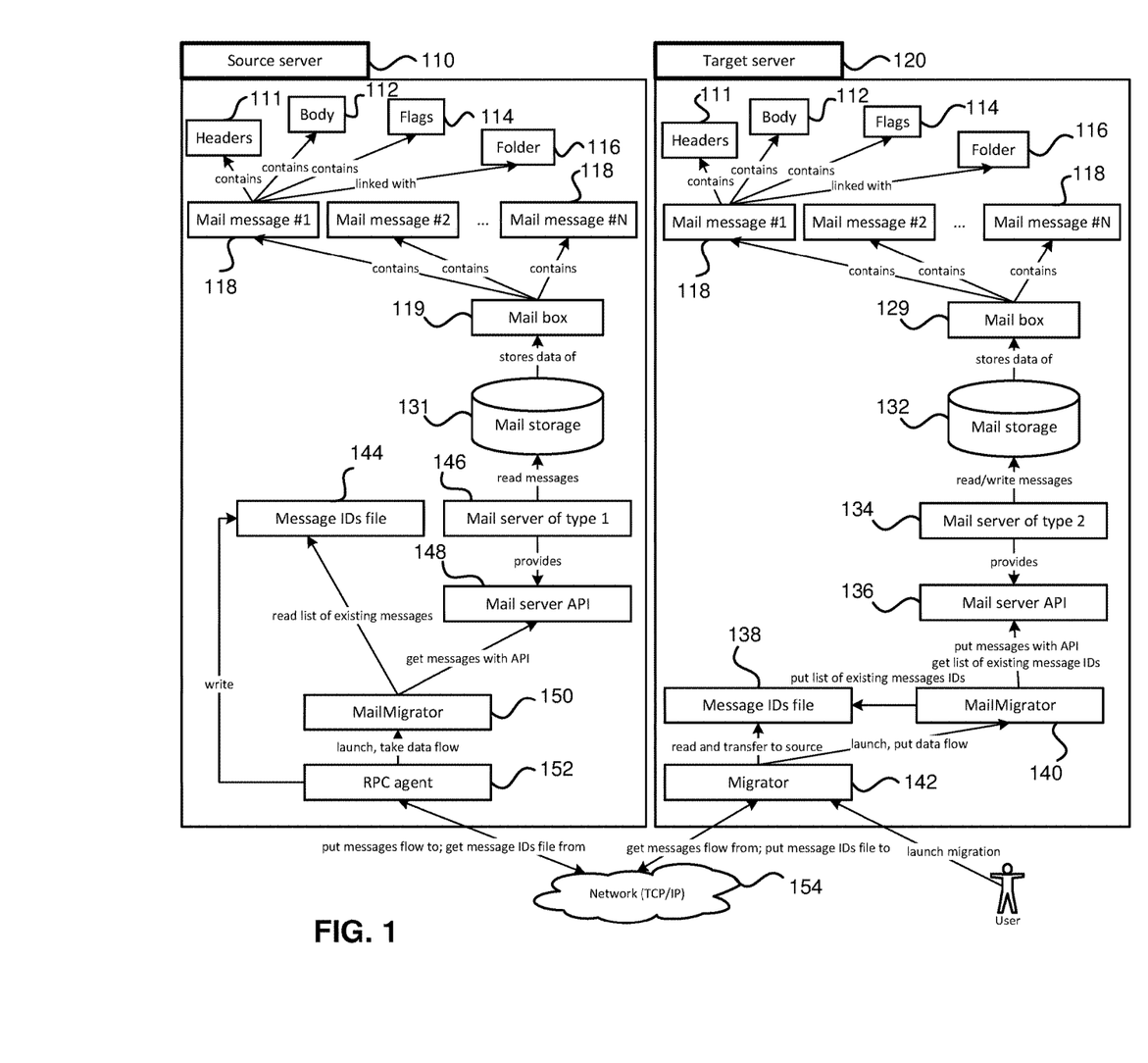
FIG. 1 illustrates a mail server migration system where both mail servers provide APIs to work with messages, in accordance with the exemplary embodiment.

FIG. 1 illustrates a mail server migration system where both mail servers provide APIs to work with messages in accordance with the exemplary embodiment. This embodiment represents a medium case in terms of a transfer time. On a source server side 110 a data of mail box 119 is stored in mail storage 131. The mail box 119 contains messages 118, where each of the messages contains headers 111, body 112 and flags 114.

Each of the messages 118 is also linked to a folder 116. A mail server (type 1) 146 reads messages from the mail storage 131. The mail server 146 provides mail server APIs 148 enabling a MailMigrator 150 to acquire the mail messages 118 from the mail server 146. An RPC agent module 152 acquires the message IDs file from a Migrator 142 on a target server 120 over a network 154 and writes the message IDs into a file 144. Then, the MailMigrator 150 can read a list of the existing messages from the file 144. Then, the MailMigrator 150 provides the data flow to the RPC agent module 152, which provides it to the Migrator 142 on the target server 120 over the network 154.

The Migrator 142 writes the message IDs into a file 138 and provides the messages to a MailMigrator 140. The MailMigrator 140 provides messages to a mail server 134 via a mail server API 136. Then, the mail server 134 writes the migrated message into mail storage 132. Subsequently, these messages are provided to a mailbox 129 and the messages 118 with corresponding headers 111, body 112, flags 114 and linked folders 116 become available on the target server 120. The migration process is launched by a user, who launches the Migrator 142.

Figure 2:
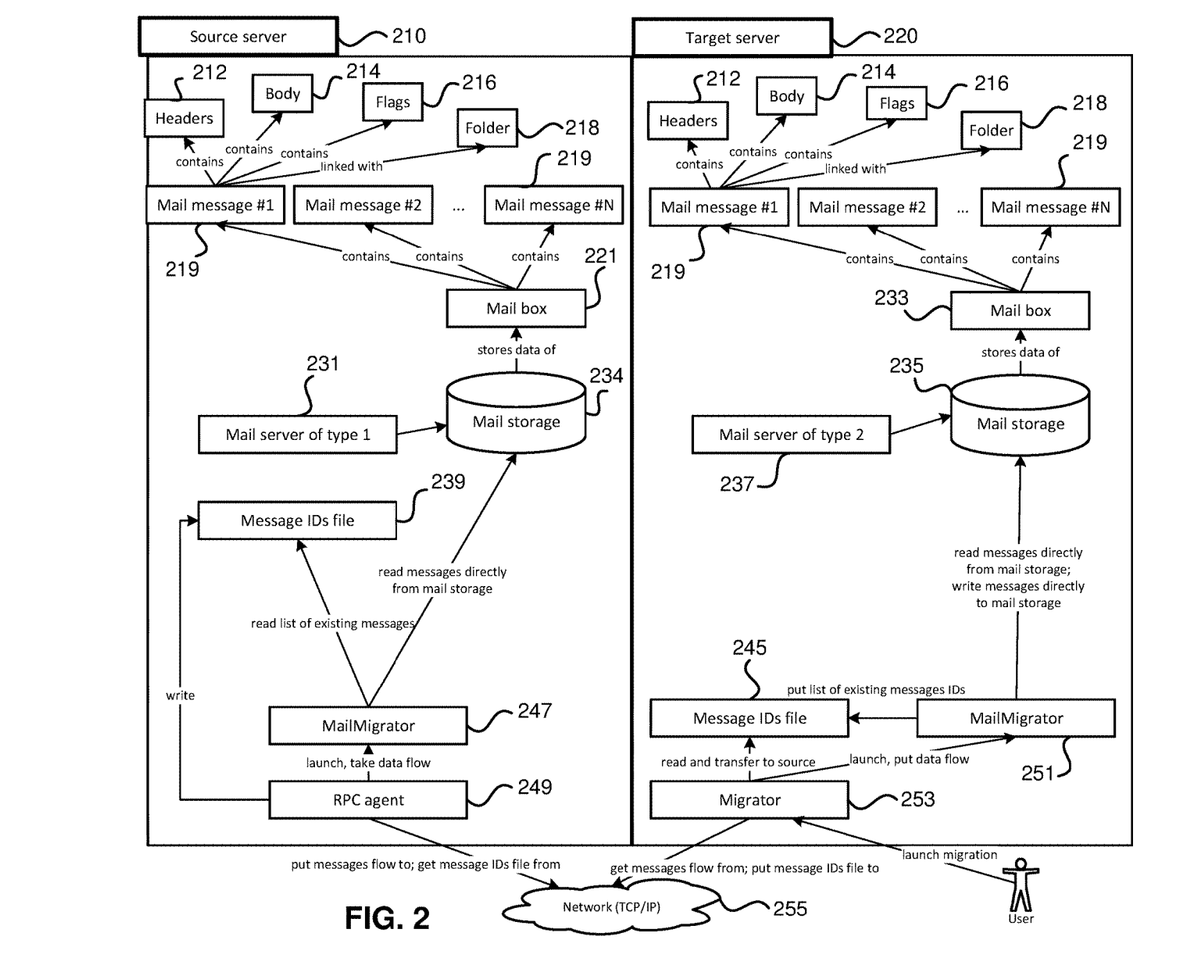
FIG. 2 illustrates a mail server migration system where mail messages are read/written directly to mail storage, in accordance with the exemplary embodiment.

FIG. 2 illustrates a mail server migration system where mail messages are read/written directly to mail storage, in accordance with the exemplary embodiment. This embodiment represents the fastest case in terms of a transfer time. On a source server side 210 mail storage 234 stores data of a mail box 221. The mail box 221 contains messages 219, where each of the messages contains headers 212, body 214 and flags 216. Each of the messages 219 is also linked to a folder 218. A mail server (type 1) 231 reads and writes messages from and to the mail storage 234. A MailMigrator 247 acquires the mail messages 219 directly from the mail storage 234. The Migrator 253 writes the message IDs into a file 245. An RPC agent module 249 acquires the message IDs file from a migrator module 253 on a target server 220 over a network 255 and writes the message IDs into a file 239. The message IDs indicate the files to be migrated. Then, the MailMigrator 247 can read a list of the existing messages from the file 239. Then, the MailMigrator 247 provides the data flow to the RPC agent module 249, which provides it to the migrator module 253 on the target server 220 over the network 255.

The Migrator 253 provides the messages to a MailMigrator 251. The MailMigrator 251 provides messages directly to mail storage 235. Then, the mail server 237 can access the migrated message from the mail storage 235. Subsequently, these messages are provided to a mailbox 233 and the messages 229 with corresponding headers 212, body 214, flags 216 and linked folders 218 become available on the target server 220. The migration process is launched by a user, who launches the migrator unit 253.

Figure 3:
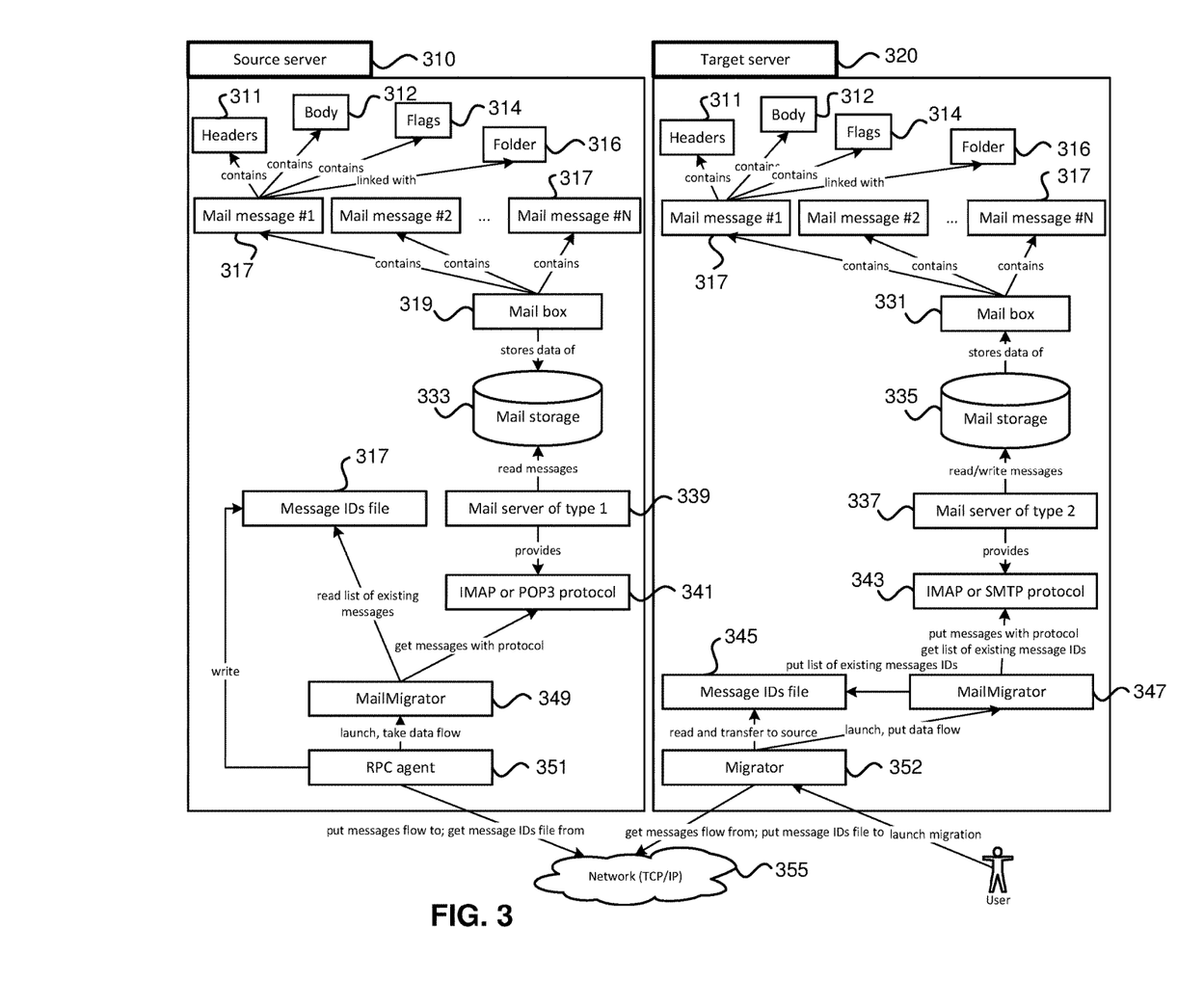
FIG. 3 illustrates a mail server migration system that uses standard protocols such as IMAP/SMTP/POP3, in accordance with the exemplary embodiment.

FIG. 3 illustrates a mail server migration system that uses standard protocols such as IMAP/SMTP/POP3, in accordance with the exemplary embodiment. In this embodiment, there is no API available, and either mail storage cannot be used directly, or implementation efforts to use API/mail storage are high. This is the slowest case in terms of a transfer time.

On a source server side 310 a mail box 319 stores data from mail storage 333. The mail box 319 contains messages 317, where each of the messages contains headers 311, body 312 and flags 314. Each of the messages 317 is also linked to a folder 316. A mail server (type 1) 339 reads messages from the mail storage 333. The mail server 339 provides IMAP or POP3 protocol 341 enabling a MailMigrator 349 to acquire the mail messages 311 from the mail server 339. The Migrator 352 writes the message IDs into a file 345. An RPC agent module 351 acquires the message IDs file from a Migrator 352 on a target server 320 over a network 355 and writes the message IDs into a file 317. Then, the MailMigrator 349 can read a list of the existing messages from the file 317. Then, the MailMigrator 349 provides the data flow to the RPC agent module 351, which provides it to the migrator module 352 on the target server 320 over the network 355.

The Migrator provides the messages to a MailMigrator 347. The MailMigrator 347 provides messages to a mail server (type 2) 337 via IMAP or SMTP protocol 343. Then, the mail server 337 writes the migrated message into mail storage 335. Subsequently, these messages are provided to a mailbox 331 and the messages 317 with corresponding headers 311, body 312, flags 314 and linked folders 316 become available on the target server 320. The migration process is launched by a user, who launches the migrator module 352.

Figure 4:
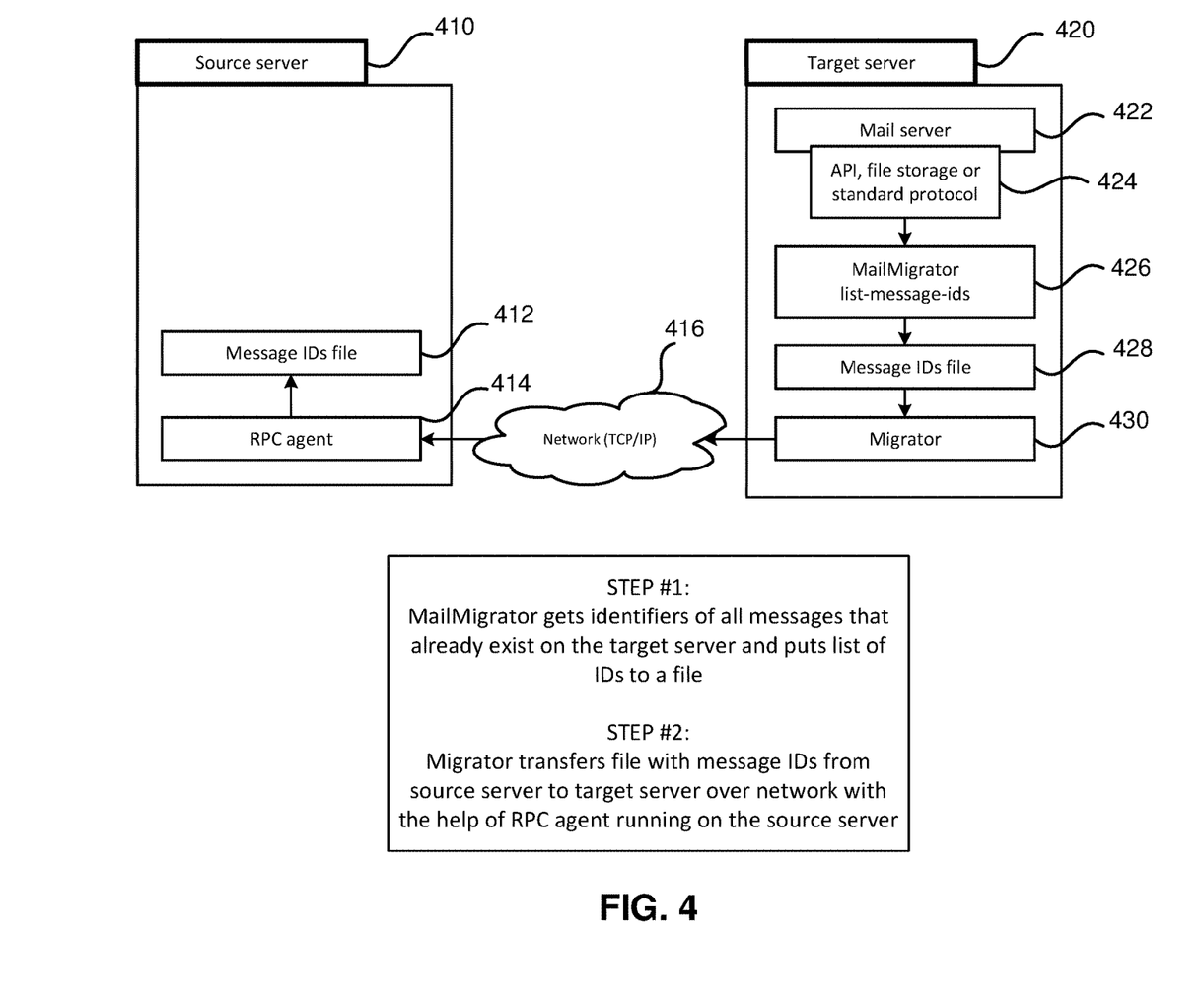
FIG. 4 illustrates a data flow diagram for a first migration step, in accordance with the exemplary embodiment.

FIG. 4 illustrates a data flow diagram for a first migration step, in accordance with the exemplary embodiment. In this step, a MailMigrator acquires identifiers (IDs) of all messages (426) that already exist on the target server 420 from a mail server 422 using an API or a standard protocol (424) and puts a list of IDs to a file (see 428). A migrator 430 transfers the message IDs file 428 from the source server 410 to the target server over a network 416 using an RPC agent 414 running on the source server 410.

Figure 5:
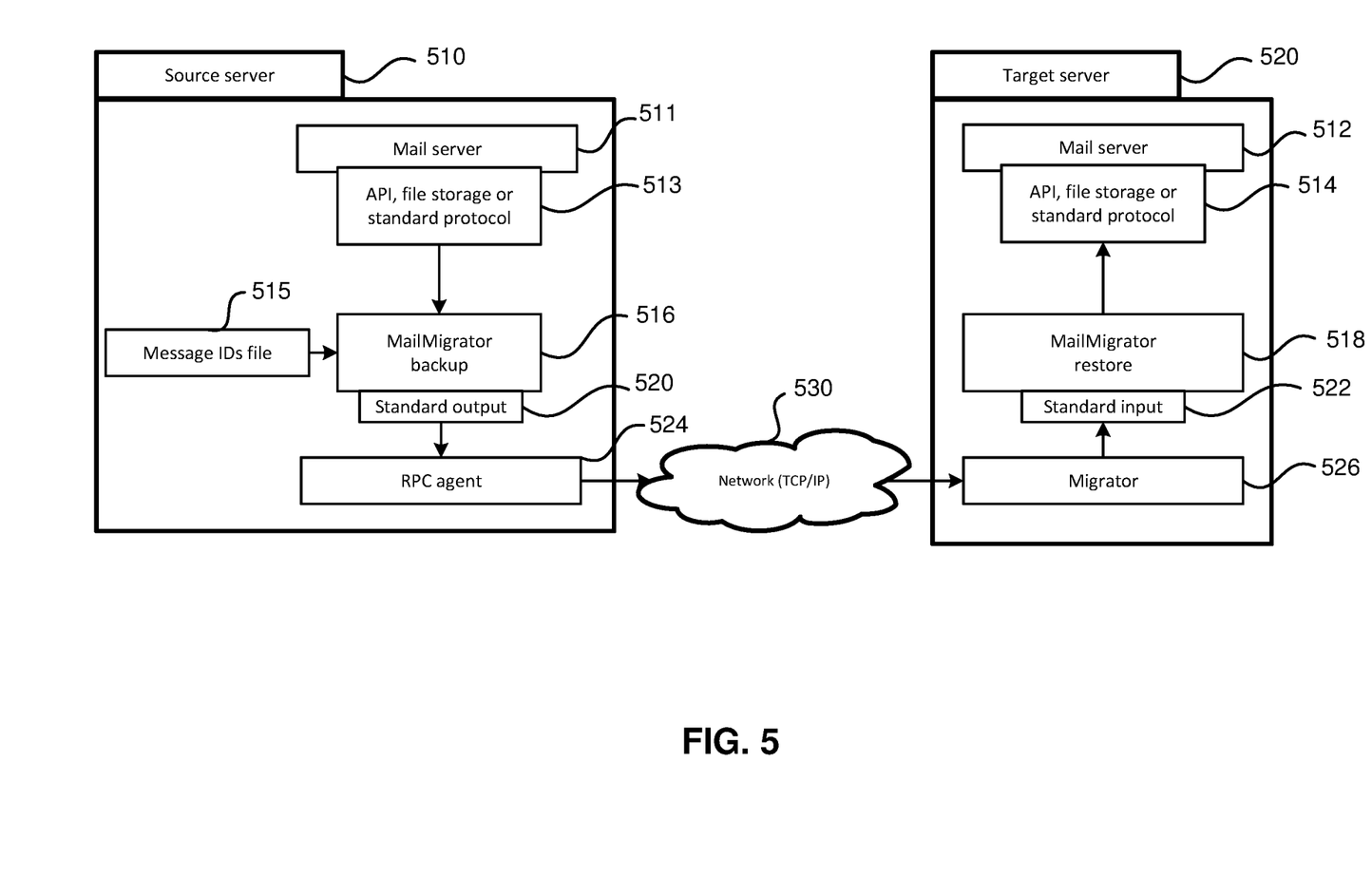
FIG. 5 illustrates a data flow diagram for a second migration step, in accordance with the exemplary embodiment.

FIG. 5 illustrates a data flow diagram for a second migration step, in accordance with the exemplary embodiment. A MailMigrator 516 is started in backup mode on the source server 510. It takes messages from a source mail server 511, skipping ones from message IDs file 515. It puts messages to RPC agent 524 as a binary message data flow. A MailMigrator 518 is started in a restore mode on the target server 520. It reads messages flow from a Migrator 526 and restores messages to the target mail server 512 via API or standard protocol 514. An RPC agent 524 sends binary messages data flow to the migrator 526 via network 530. The Migrator 526 provides data flow to the MailMigrator 518 on the target server 520.

Figure 6:
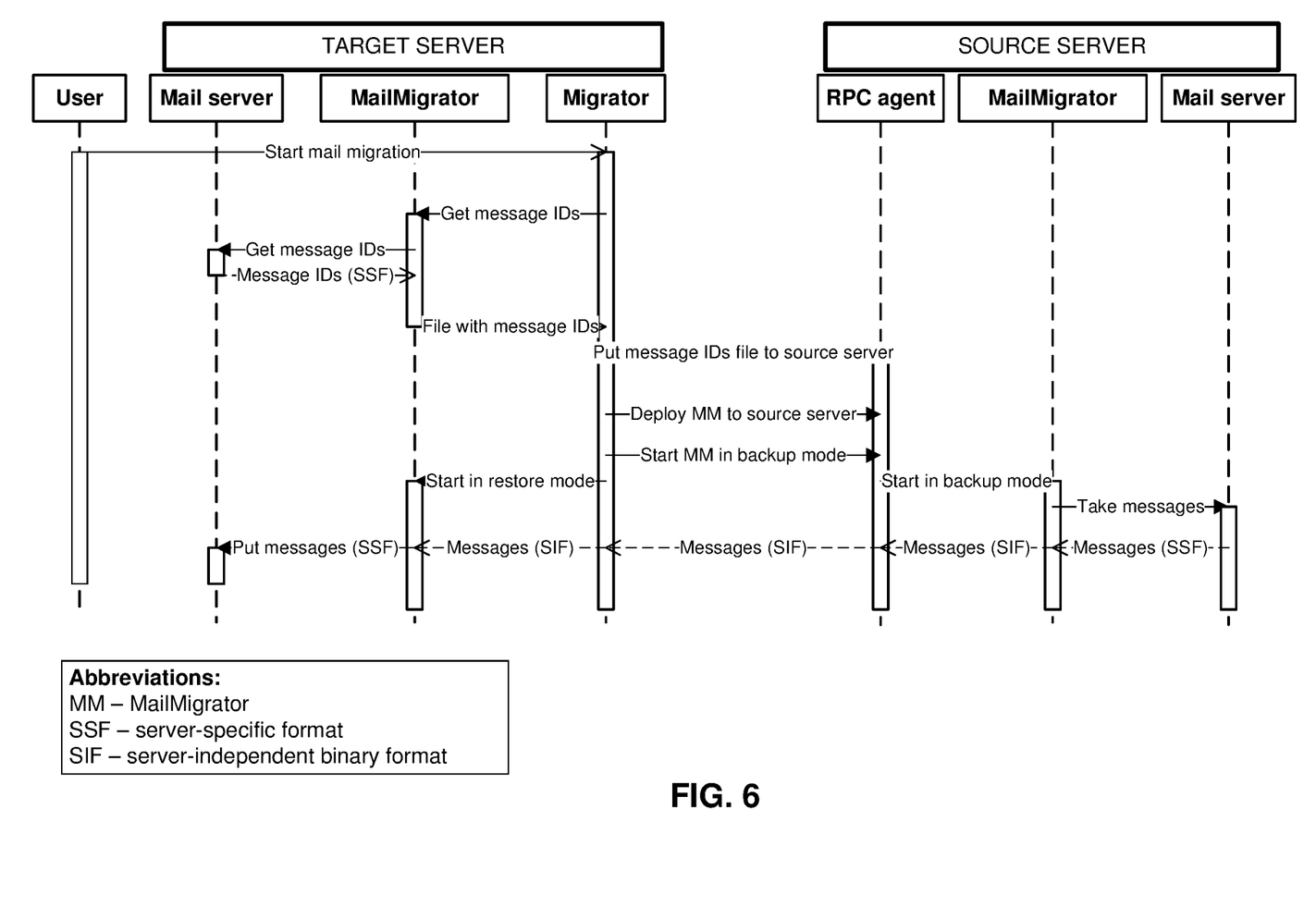
FIG. 6 illustrates a mail server migration sequence, in accordance with the exemplary embodiment.

FIG. 6 illustrates a mail server migration sequence, in accordance with the exemplary embodiment. A user launches a migrator module on target server. The Migrator requests message IDs from a MailMigrator module and in response receives a file with message IDs. Then, the Migrator provides the message IDs file to an RPC agent on a source server. The MailMigrator is deployed to the source server and the MailMigrator is started in a backup mode. The mail server provides messages in a server-specific format to the MailMigrator, which converts them into a server-independent binary format and sends them to the Migrator on the target server. The migrator provides the messages to the target MailMigrator, which provides the messages to the target mail server.

Figure 7:
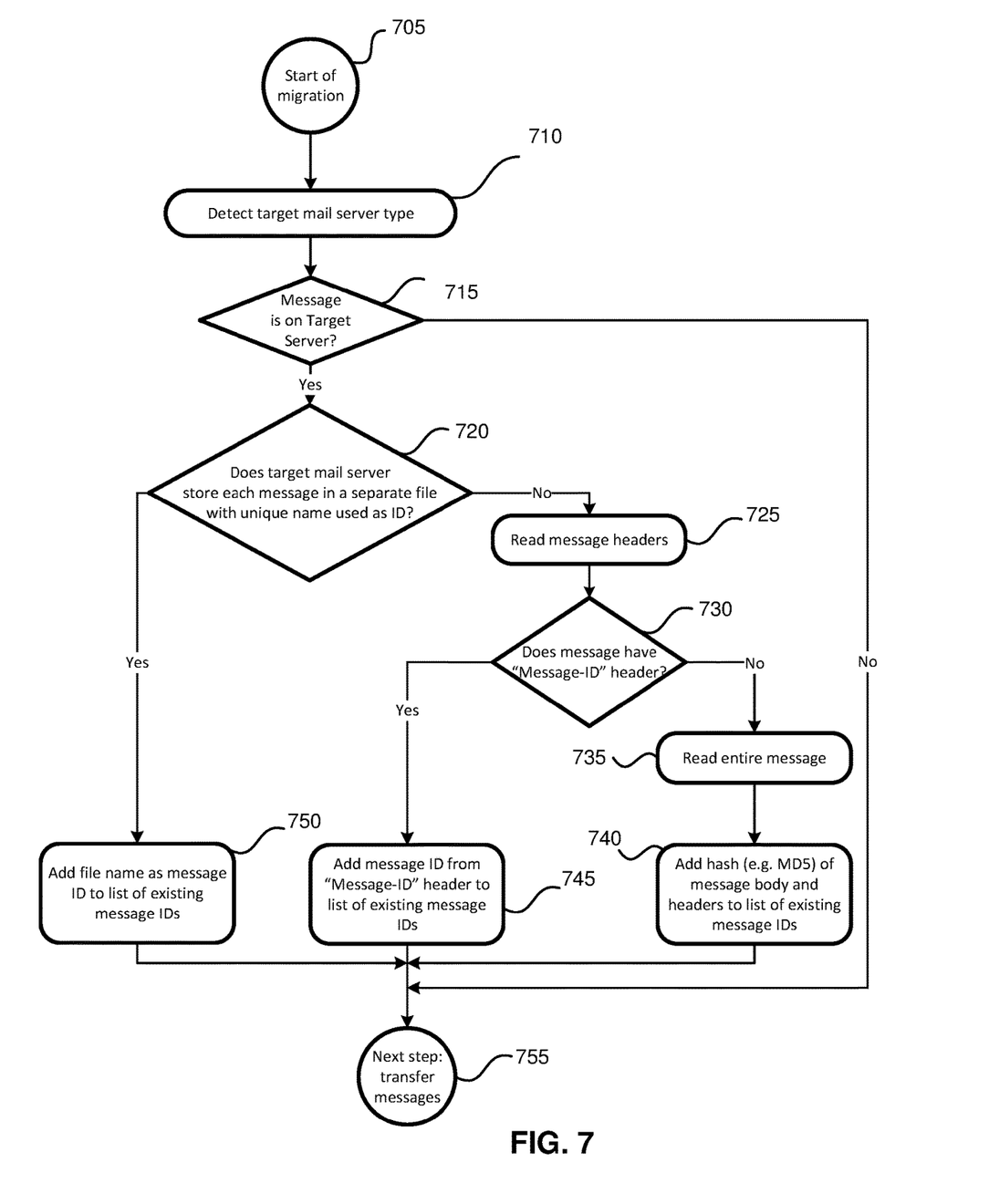
FIG. 7 illustrates a flowchart for listing message IDs, in accordance with the exemplary embodiment.

FIG. 7 illustrates a flowchart for listing message IDs, in accordance with the exemplary embodiment. Migration is started in step 705. The process detects target mail server type in step 710. The process checks if there are messages on the target server in step 715. If no messages are present, the process moves to step 755. Otherwise, if, in step 720, a target mail server stores each message in a separate file with a unique name used as an ID, the process adds the file name as an ID to an existing message ID list in step 750. Otherwise, the process reads message headers in step 725. If, in step 730, the message has a message ID header, the process adds the message ID from the header to a list of existing message IDs. Otherwise, the process reads the entire message in step 735 and adds a hash of the message body and headers to a list of existing message IDs. The process repeats for each message in the target mailbox. Then the process moves to step 755 depicted in FIG. 8.

Figure 8:
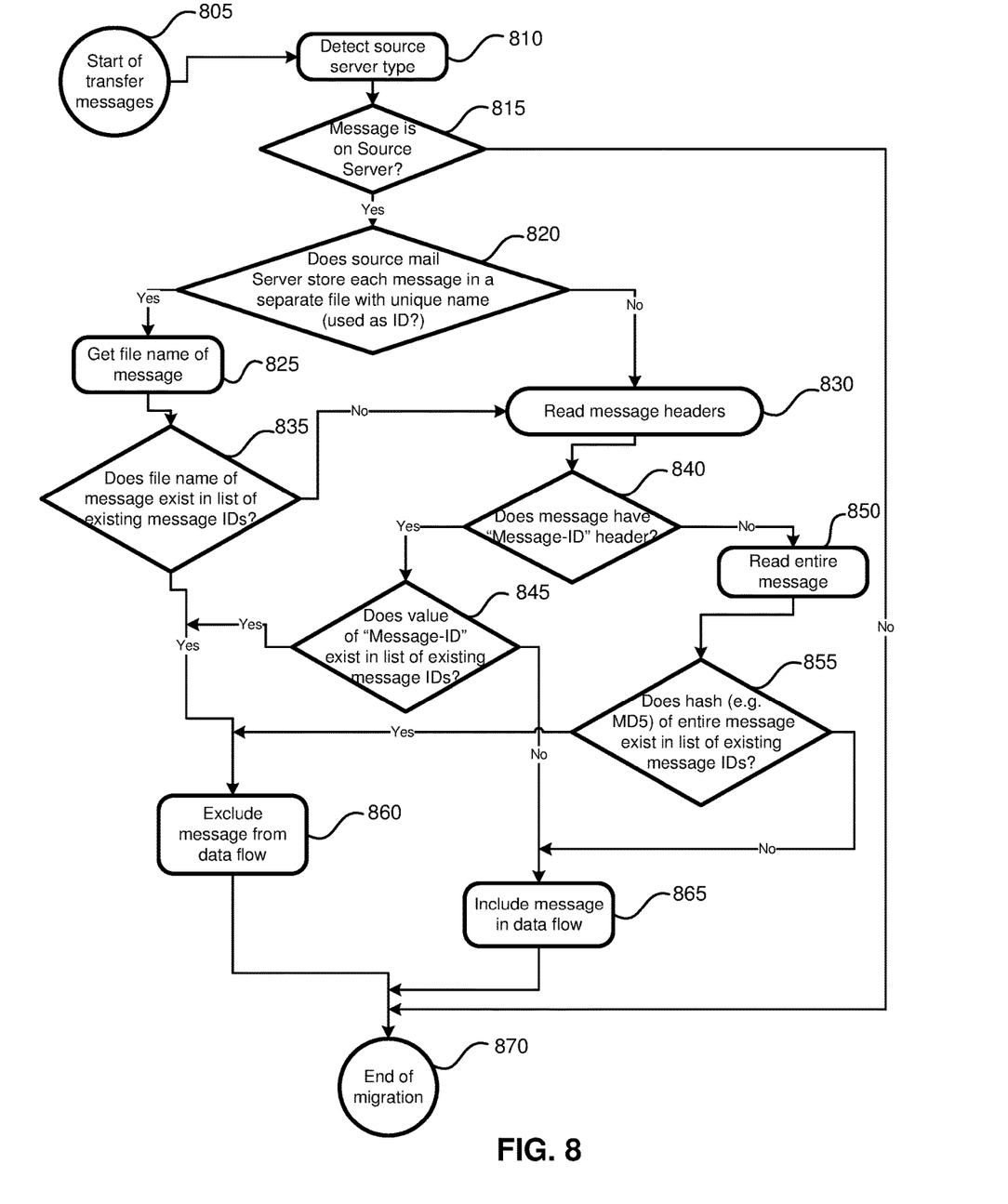
FIG. 8 illustrates a flowchart for selecting messages to be transferred from a source server to a target server, in accordance with the exemplary embodiment.

FIG. 8 illustrates a flowchart for selecting messages to be transferred from a source server to a target server, in accordance with the exemplary embodiment. A message transfer is started in step 805. The source server type is detected in step 810. If the message is on a source server in step 815, the process checks if, in step 820, a source mail server stores each message in a separate file with a unique name used as an ID. If a source mail server stores each message in a separate file with a unique name used as an ID the process acquires a file name of the message in step 825. Otherwise, the process reads a message header in step 830 and checks if the message has a message ID header in step 840. If the message ID is not in the header, the process reads the entire message in step 850. Otherwise, the process checks if the value of the message ID is in the list of existing message IDs in step 845. If the value is in the list, the message is excluded from a data flow in step 860. If, in step 855, the hash of the entire message is in a list of the existing message IDs, the process moves to step 860 and excludes the message from the data flow. Otherwise, the process includes message into the data flow in step 865. In step 835, the process checks if the file name of the message is in a list of message IDs. If the file name is in the list, the process moves to step 860. Otherwise, the process moves to step 830. The whole process is repeated for each message in the source mailbox.

Figure 9:
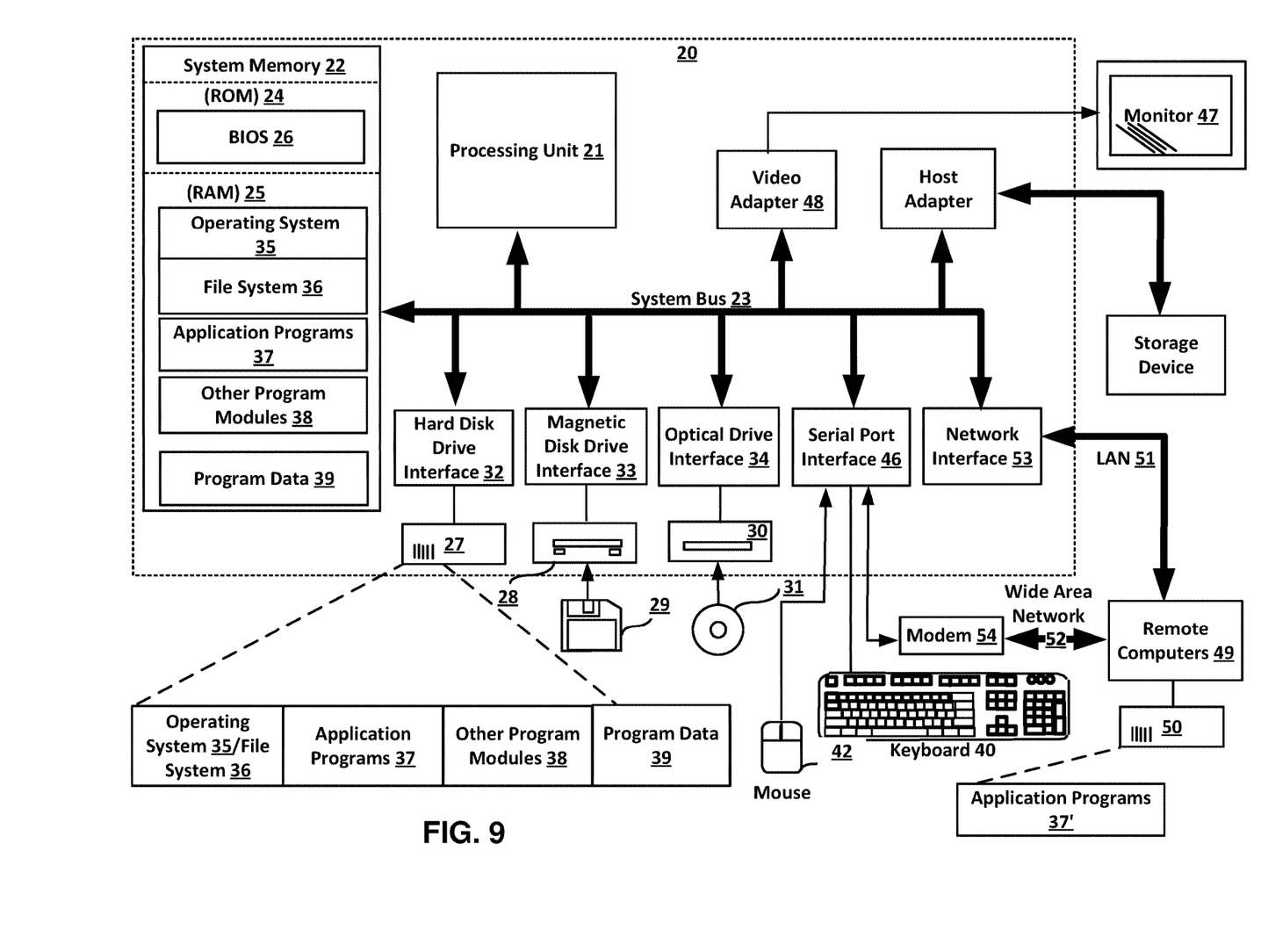
FIG. 9 illustrates a server, which can be used in the exemplary embodiment.

With reference to FIG. 9, an exemplary system for implementing the invention includes a general purpose computing device in the form of a server 110/120 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 250, such as during start-up, is stored in ROM 24.

The server 110/120 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 110/120. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™). The server 110/120 includes a file system 36 associated with or included within the operating system 35, such as the Windows NT™ File System (NTFS), one or more application programs 37, other program modules 38 and program data 39. A user may enter commands and information into the server 110/120 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 110/120 may operate in a networked environment using logical connections to one or more remote computers 49. The remote computer (or computers) 49 may be another personal computer, a server, a router, a network PC, a peer device or other common network node, and it typically includes some or all of the elements described above relative to the server 110/120, although here only a memory storage device 50 is illustrated. The logical connections include a local area network (LAN) 51 and a wide area network (WAN) 52. Such networking environments are common in offices, enterprisewide computer networks, Intranets and the Internet.

In a LAN environment, the server 110/120 is connected to the local network 51 through a network interface or adapter 53. When used in a WAN networking environment, the server 250 typically includes a modem 54 or other means for establishing communications over the wide area network 52, such as the Internet. The modem 54, which may be internal or external, is connected to the system bus 23 via the serial port interface 46. In a networked environment, the program modules depicted relative to the server 250, or portions thereof, may be stored in the remote memory storage device. It will be appreciated that the network connections shown are merely exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for an efficient detection of drugs located inside person's stomach.

It should also be appreciated that various modifications, adaptations, and alternative embodiments thereof may be made within the scope and spirit of the present invention. The invention is further defined by the following claims.

APPENDIX I

Whether additional logging is enabled for MailMigrator running on the source server
Corresponding log will be put to "mail-backup.log" mail-source-log-enabled: false
Whether additional logging is enabled for MailMigrator running on the target server
Corresponding logs will be put to:
"mail-restore.log"
"mail-list-messages.log" mail-target-log-enabled: false
Override mail server type used by MailMigrator running on the source server.
Examples of possible values: "mailenable", "smartermail", "imap", and so on. mail-source-provider:
Override mail server type used by MailMigrator running on the target server.
Examples of possible values: "mailenable", "smartermail", "imap", and so on. mail-target-provider:
Additional command line options to pass to MailMigrator running on the source server.
Example of value (to specify IMAP port): --port=123 mail-source-additional-options:
Additional command line options to pass to MailMigrator running on the target server.
Example of value (to specify IMAP port): --port=123 mail-target-additional-options:

What is claimed is:

1. A system for migration of a mail server that includes a processor, the system comprising:

a migration utility running on the processor where a target server is running, and configured to acquire a list of message identifiers (IDs) of all messages that have already been migrated and that already exist on the target server, and to write a list of the IDs into a file, wherein the message IDs are generated based on a file name where each message is stored, if available, otherwise, based on a message header, if available, otherwise, based on a hash of the corresponding message;

the migration utility configured to execute a command to import, to the target server, any remaining messages that have not yet been migrated, and store the remaining messages on the target server;

a target mail server residing on the target server; and the migration utility connecting to a source server using a Remote Procedure Call (RPC) agent for a transfer of the mail messages to the migration module in a stateless manner and for importing the mail messages to the target mail server, wherein the messages are transferred using (i) a mail server Application Programming Interface, otherwise (ii) directly onto mail storage, otherwise (iii) using an IMAP protocol, and otherwise (iv) using POP3 protocol.

2. The system of claim 1, wherein the target mail server stores message onto the mail storage.

3. The system of claim 1, wherein the target mail server is of a different type from a source mail server residing on a source server.

4. A method for migration of a mail server, the method comprising:

launching a migration utility on a target server, the target server executing on a processor;

acquiring a list of message identifiers (IDs) of all messages that have already been migrated and that already exist on the target server, and writing a list of the message IDs into a file, wherein the message IDs are generated based on a file name where each message is stored, if available, otherwise, based on a message header, if available, otherwise, based on a hash of the corresponding message; and connecting the migration utility to a source server using a Remote Procedure Call (RPC) agent that receives the file with the message IDs, for a transfer of the mail messages to the migration module in a stateless manner and for using the migration utility to import, to the target server, any remaining messages that have not yet been migrated from a source server, and to store the remaining messages on the target server using IMAP or POP3 protocols, wherein the messages being transferred are converted into a server-independent binary form for transmission from the source server to the target server.

5. The method of claim 4, further comprising copying the messages using (i) a mail server Application Programming Interface, otherwise (ii) directly onto mail storage, otherwise (iii) using an IMAP protocol, and otherwise (iv) using POP3 protocol.

6. The method of claim 4, wherein the target mail server stores message onto the mail storage.

7. The method of claim 4, wherein the target mail server is of a different type from a source mail server residing on the source server.

* * * * *